United States Patent
Karr et al.

(10) Patent No.: US 11,732,738 B1
(45) Date of Patent: Aug. 22, 2023

(54) POTTED-IN INSERTS COMPRISING A LATTICE STRUCTURE, METHOD OF SECURING OBJECTS TO SANDWICH PANELS THEREWITH, AND METHODS FOR PRODUCING THE SAME

(71) Applicant: HONEYWELL INTERNATIONAL INC., Charlotte, NC (US)

(72) Inventors: Austin Karr, Phoenix, AZ (US); Clayton Sutter, Phoenix, AZ (US); Henry Lastre, Phoenix, AZ (US); Brandon Griggs, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/661,064

(22) Filed: Apr. 28, 2022

(51) Int. Cl.
*F16B 1/00* (2006.01)
*F16B 5/01* (2006.01)
*F16B 37/12* (2006.01)

(52) U.S. Cl.
CPC .............. *F16B 5/01* (2013.01); *F16B 37/122* (2013.01)

(58) Field of Classification Search
CPC ................................. F16B 5/01; F16B 37/122
USPC ........................................................ 411/82.1
See application file for complete search history.

(56) References Cited

U.S. PATENT DOCUMENTS

| | | | |
|---|---|---|---|
| 4,902,180 A | 2/1990 | Gauron | |
| 4,941,785 A | 7/1990 | Witten | |
| 5,104,266 A * | 4/1992 | Daryoush | F16B 13/146 428/116 |
| 5,483,781 A * | 1/1996 | Ernst | F16B 13/141 405/259.5 |
| 5,632,582 A | 5/1997 | Gauron | |
| 6,837,018 B1 * | 1/2005 | Hagel | E04G 23/0207 411/930 |
| 9,844,929 B2 | 12/2017 | Coon et al. | |
| 10,228,003 B2 | 3/2019 | Nipper et al. | |
| 10,599,132 B2 | 3/2020 | Coon et al. | |
| 2010/0115882 A1 | 5/2010 | Seroiszka et al. | |
| 2014/0212241 A1 | 7/2014 | Burd et al. | |
| 2016/0377108 A1 * | 12/2016 | Cloud | F16B 19/008 411/82.1 |

(Continued)

FOREIGN PATENT DOCUMENTS

| | | |
|---|---|---|
| EP | 1024301 A2 | 8/2000 |
| FR | 2872232 A1 | 12/2005 |

(Continued)

*Primary Examiner* — Gary W Estremsky
(74) *Attorney, Agent, or Firm* — Lorenz & Kopf, LLP

(57) ABSTRACT

Potted-in inserts are provided for use as attachment points for securing objects to sandwich panels. The potted-in inserts comprise a shaft having a first outer diameter, a first end having a second outer diameter that is greater than the first diameter, a second end having a third outer diameter, and an inner bore extending through the first end, the shaft, and the second end. The inner bore having an inner diameter. A lattice structure is between the first end and the second end and in an area adjacent the shaft between the first diameter and the second diameter. The lattice structure is fixed to the first end, the second end, and/or the shaft. The lattice structure has a plurality of interconnected unit cells each comprising struts connected at nodes to define voids between the struts. The voids are sufficiently large to receive therethrough a potting compound.

20 Claims, 5 Drawing Sheets

(56) References Cited

U.S. PATENT DOCUMENTS

2017/0253006 A1\* 9/2017 Lopez .................... B32B 3/266
2017/0335875 A1\* 11/2017 Lejars ............... B29C 45/14311
2021/0381540 A1 12/2021 Ptochos et al.

FOREIGN PATENT DOCUMENTS

| JP | 5436468 | B2 | 3/2014 |
| KR | 20110130636 | A | 12/2011 |
| WO | 2010150682 | A1 | 12/2010 |
| WO | 2019138660 | A1 | 7/2019 |

\* cited by examiner

POTTED-IN INSERTS COMPRISING A LATTICE STRUCTURE, METHOD OF SECURING OBJECTS TO SANDWICH PANELS THEREWITH, AND METHODS FOR PRODUCING THE SAME

TECHNICAL FIELD

The present invention generally relates to sandwich panels, and more particularly relates to potted-in inserts and methods of securing objects to sandwich panels.

BACKGROUND

Sandwich panels are composite panel structures that have at least three layers including a pair of exterior, relatively thin and rigid layers (typically referred to as face sheets or skins) separated and coupled by an internal, relatively lightweight and thick core layer (referred to herein simply as a core). Relative to conventional panels comprising a single layer or multiple parallel layers, sandwich panels may provide a combination of high structural rigidity and low weight. Sandwich panels are used in various applications and therefore the skins and cores may be formed of various materials and have various structures. The cores may include a solid filling such as a low-density, open- or closed-cell foam or a structure having plurality of connected walls that are out-of-plane with the skins (e.g., honeycomb structure).

Sandwich panels have been widely adopted, especially in industries such as the automotive, aerospace, marine, shipping, and sports equipment industries where reductions in weight may provide substantial benefits. As a specific example, sandwich honeycomb paneling is commonly used in aircraft manufacturing as a lightweight, rigid solution for bulkheads, cabin dividers, and other structures. The sandwich honeycomb paneling generally have a core between the face sheets that includes an array of hollow cells that are hexagonal in shape and defined by a plurality of connected walls that are oriented perpendicular to the face sheets.

While the sandwich panels can provide several significant benefits, mounting objects to the sandwich panels may be challenging due to the low density and/or partially hollow core. A common approach to addressing this issue involves the use of low-profile potted-in inserts (also referred to as wall panel inserts or floating inserts). Potted-in inserts generally include a tubular shaft having a pair of flanges on ends thereof and an inner bore therethrough. Typical installation of potted-in inserts includes drilling a hole in the sandwich panel, locating the potted-in insert within the hole (typically such that a face of one of the flanges is flush with adjacent exterior surfaces of the corresponding face sheet), and then injecting a potting compound (e.g., an epoxy) into the sandwich panel to fill a cavity surrounding the potted-in insert. Once the potting compound cures, the inner bore of the potted-in insert can receive a fastener and thereby provide an attachment point within the sandwich panels for securing objects thereto.

Currently available potted-in inserts may suffer from various drawbacks. For example, the weight rating of the installed potted-in inserts may be too low for securing relatively heavy objects (e.g., large wall-mounted televisions) to the sandwich panels. This may result from poor bonding between the potted-in insert and the sandwich panel. For example, the potted-in inserts often comprise relatively smooth tubular shafts that may not promote a robust bond with the potting compound. Further, air pockets can occur during installation if the potting compound does not entirely fill the cavity surrounding the tubular shaft.

Hence, there is a need for potted-in inserts that are capable of promoting a robust bond with sandwich panels and are therefore capable of securing relatively heavy objects thereto.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A potted-in insert is provided for use as an attachment point for securing an object to a sandwich panel. The potted-in insert comprises a shaft having a first outer diameter, a first end having a second outer diameter, wherein the second outer diameter is greater than the first outer diameter, a second end having a third outer diameter, and an inner bore extending through the first end, the shaft, and the second end. The inner bore defined by interior surfaces thereof, and having an inner diameter. A lattice structure is between the first end and the second end and in an area adjacent the shaft between the first outer diameter and the second outer diameter. The lattice structure is fixed to the first end, the second end, and/or the shaft. The lattice structure has a plurality of interconnected unit cells each comprising struts connected at nodes to define voids between the struts. The voids are sufficiently large to receive therethrough a potting compound.

A method is provided for securing an object to a sandwich panel. The method comprises providing a potted-in insert comprising a shaft having a first outer diameter, a first end having a second outer diameter, wherein the second outer diameter is greater than the first outer diameter, a second end having a third outer diameter, and an inner bore extending through the first end, the shaft, and the second end, defined by interior surfaces thereof, and having an inner diameter. A lattice structure is between the first end and the second end and in an area adjacent the shaft between the first outer diameter and the second outer diameter. The lattice structure is fixed to the first end, the second end, and/or the shaft. The lattice structure has a plurality of interconnected unit cells each comprising struts connected at nodes to define voids between the struts. The voids are sufficiently large to receive therethrough a potting compound. The method further comprises boring a hole in the sandwich panel, inserting the potted-in insert into the hole, injecting the potting compound into the hole such that the potting compound is received through the voids in the lattice structure, curing the potting compound, and securing the object to the sandwich panel using the inner bore of the potted-in insert as an attachment point.

A method is provided for producing a potted-in insert. The method comprises producing the potted-in insert with an additive manufacturing process such that the potted-in insert has an integral body comprising a shaft having a first outer diameter, a first end having a second outer diameter, wherein the second outer diameter is greater than the first outer diameter, a second end having a third outer diameter, and an inner bore extending through the first end, the shaft, and the second end, defined by interior surfaces thereof, and having an inner diameter. A lattice structure is between the first end and the second end and in an area adjacent the shaft between the first outer diameter and the second outer diameter. The lattice structure is fixed to the first end, the second end, and/or the shaft. The lattice structure has a plurality of interconnected unit cells each comprising struts connected at nodes to define voids between the struts. The voids are sufficiently large to receive therethrough a potting compound.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
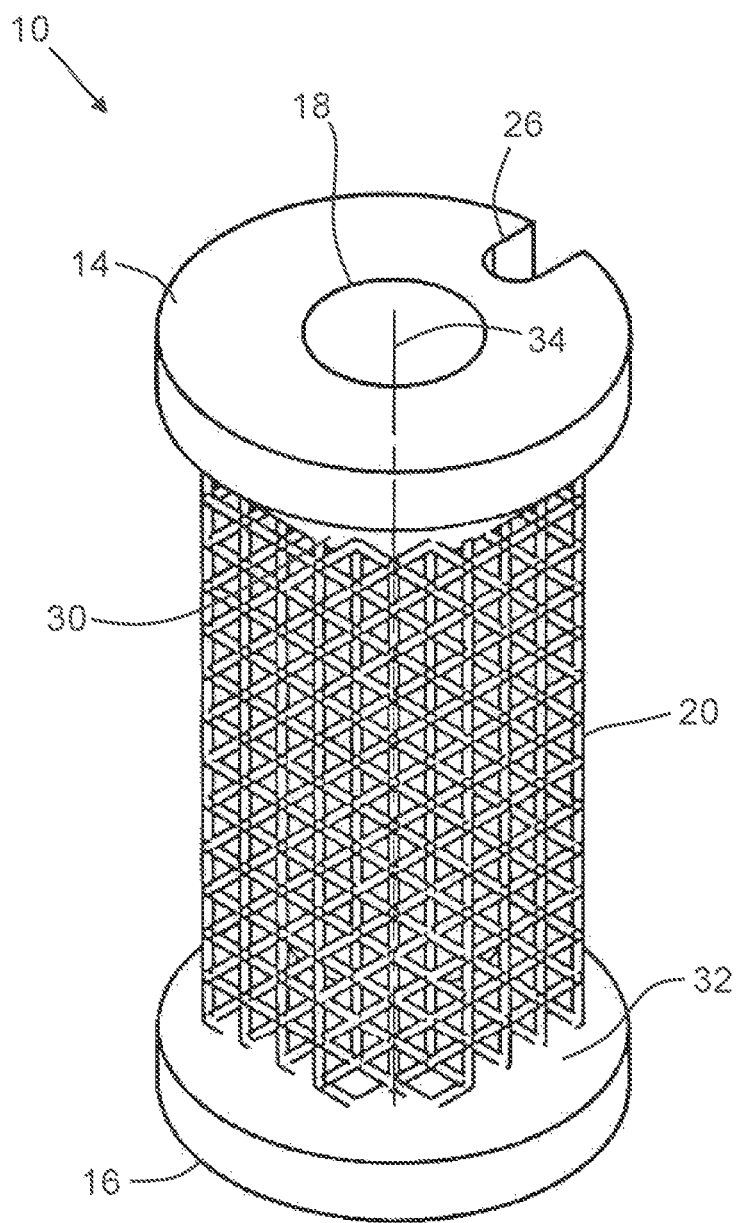
FIG. 1 represents a perspective view of a potted-in insert in accordance with certain nonlimiting aspects of the invention.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

FIGS. 1 through 5 represent various aspects of a nonlimiting embodiment of a potted-in insert 10 (also referred to as the insert 10) that may be installed in a sandwich panel (also referred to as the panel) to provide an attachment point for securing an object to the panel. The insert 10 includes a body having a shaft 12 extending between a first end 14 and a second end 16. In the embodiment represented in the figures, the body is generally tubular such that the shaft 12, the first end 14, and the second end 16 have circular outer perimeters or cross-sections. Alternatively, in some embodiments, the body and/or the individual components thereof, including the shaft 12, the first end 14, and the second end 16, may have outer perimeters that define various shapes other than circular. An inner bore 18 is provided through and defined by interior surfaces of the body, including the shaft 12, the first end 14, and the second end 16. The inner bore 18 extends along and is co-axially aligned with a central, longitudinal axis 34 of the body. The inner bore 18 has openings at exterior faces of the first end 14 and the second end 16 of the body and includes an inner diameter.

The shaft 12 has a first outer diameter that is less than second and/or third outer diameters of the first end 14 and the second end 16, respectively. The second and third outer diameters may be the same or different. An open area is defined between the first end 14 and the second end 16 along and surrounding the shaft 12. Optionally, the body may include a first intermediate portion 30 between the first end 14 and the shaft 12 and a second intermediate portion 32 between the second end 16 and the shaft 12. The first intermediate portion 30 and the second intermediate portion 32 may have tapered outer perimeters with diameters (e.g., fourth and fifth outer diameters, respectively). Specifically, the fourth outer diameter of the first intermediate portion 30 may transition between the first outer diameter of the shaft 12 and the second outer diameter of the first end 14, and the fifth outer diameter of the first intermediate portion 30 may transition between the first outer diameter of the shaft 12 and the second outer diameter of the second end 16. In the embodiment of the figures, both the first intermediate portion 30 and the second intermediate portion 32 have outer diameters with a constant rate of change to define linear outer profiles. In some embodiments, the first intermediate portion 30 and the second intermediate portion 32 may have outer diameters with a nonconstant rate of change to define nonlinear outer profiles (e.g., concave).

A slot 26 is provided through the first end 14 of the body that fluidically couples the exterior face of the first end 14 with the open area adjacent the shaft 12. In the embodiment represented in the figures, the slot 26 is defined by recessed surfaces of the first end 14 and the first intermediate portion 30.

The body includes a lattice structure 20 within the area surrounding the shaft 12 that at least partially encircles the shaft 12. As shown most clearly in FIG. 2, the lattice structure 20 comprises a plurality of unit cells each including struts 22 or portions thereof connected at nodes 24 to define a void. The lattice structure 20 may include one or more separate two-dimensional structures, or, preferably, one or more three-dimensional structures. As used herein, the lattice structure 20 is considered to be a three-dimensional structure if the lattice structure 20 includes more than one layer of unit cells in a direction extending radially from the longitudinal axis 34 of the shaft 12. In the embodiment represented in the figures, the lattice structure 20 is a three-dimensional structure with the struts 22 being linear and longitudinally oriented at 45 or 135 degrees relative to the longitudinal axis 34 of the shaft 12, and each unit cell includes twelve of the struts 22 or portions thereof that are connected such that in combination the struts 22 define a rectangular cuboid void. In some embodiments, the lattice structure 20 may have other structures that include, for example, the struts 22 being linear and longitudinally oriented at other angles relative to the longitudinal axis 34 of the shaft 12, the struts 22 being nonlinear, or combinations thereof. The voids defined by the struts 22 may have various shapes and sizes.

Figure 2:
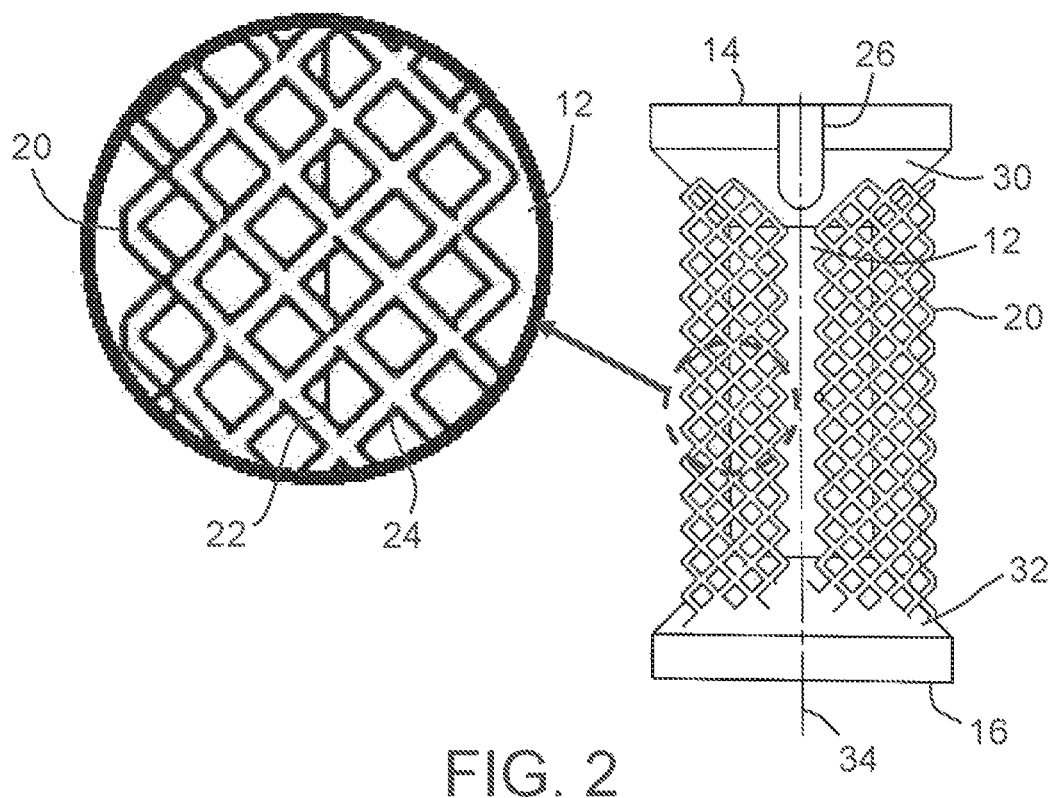
FIG. 2 represents a first side view of the potted-in insert of FIG. 1 with an enlarged view of the lattice structure of the potted-in insert.
Figure 3:
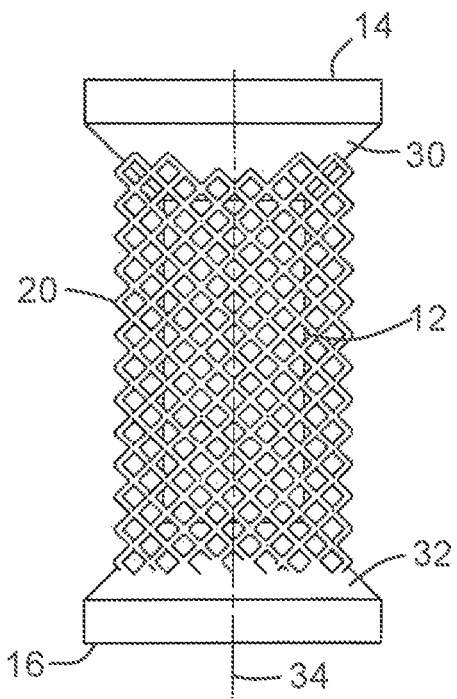
FIG. 3 represents a second side view of the potted-in insert of FIGS. 1 and 2.
Figure 4:
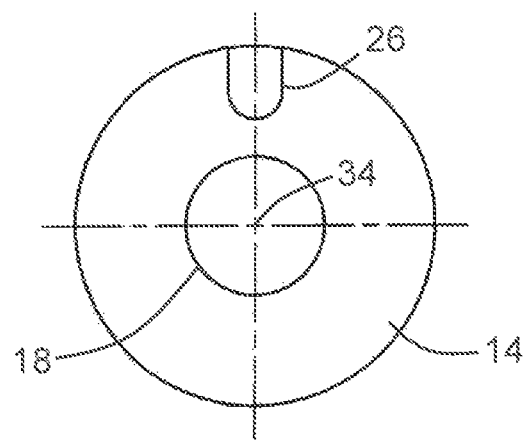
FIG. 4 represents a top view of the potted-in insert of FIGS. 1 through 3.
Figure 5:
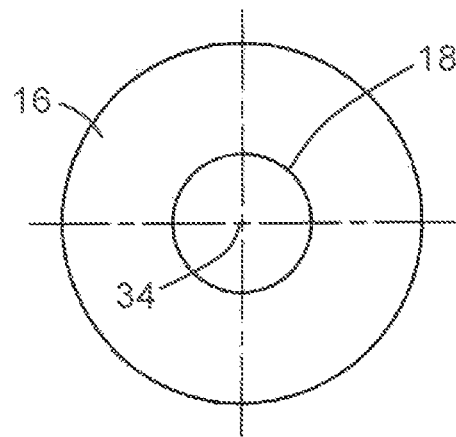
FIG. 5 represents a bottom view of the potted-in insert of FIGS. 1 through 4.

The lattice structure 20 may contact and be fixed to surfaces of the first end 14, the second end 16, the shaft 12, the first intermediate portion 30, and/or the second intermediate portion 32. In the embodiment of the figures, at least some of the struts 22 of the lattice structure 20 adjacent to and along surfaces of the shaft 12, and the first intermediate portion 30, and the second intermediate portion 32 are in contact with and fixed thereto (e.g., integral therewith). Optionally, one or more channels may be provided in the lattice structure 20 along all or a portion of the longitudinal length of the shaft 12. For example, FIG. 2 represents the body as including a linear channel through the lattice structure 20 that is aligned with the slot 26 in the first end 14 of the body.

Figure 6:
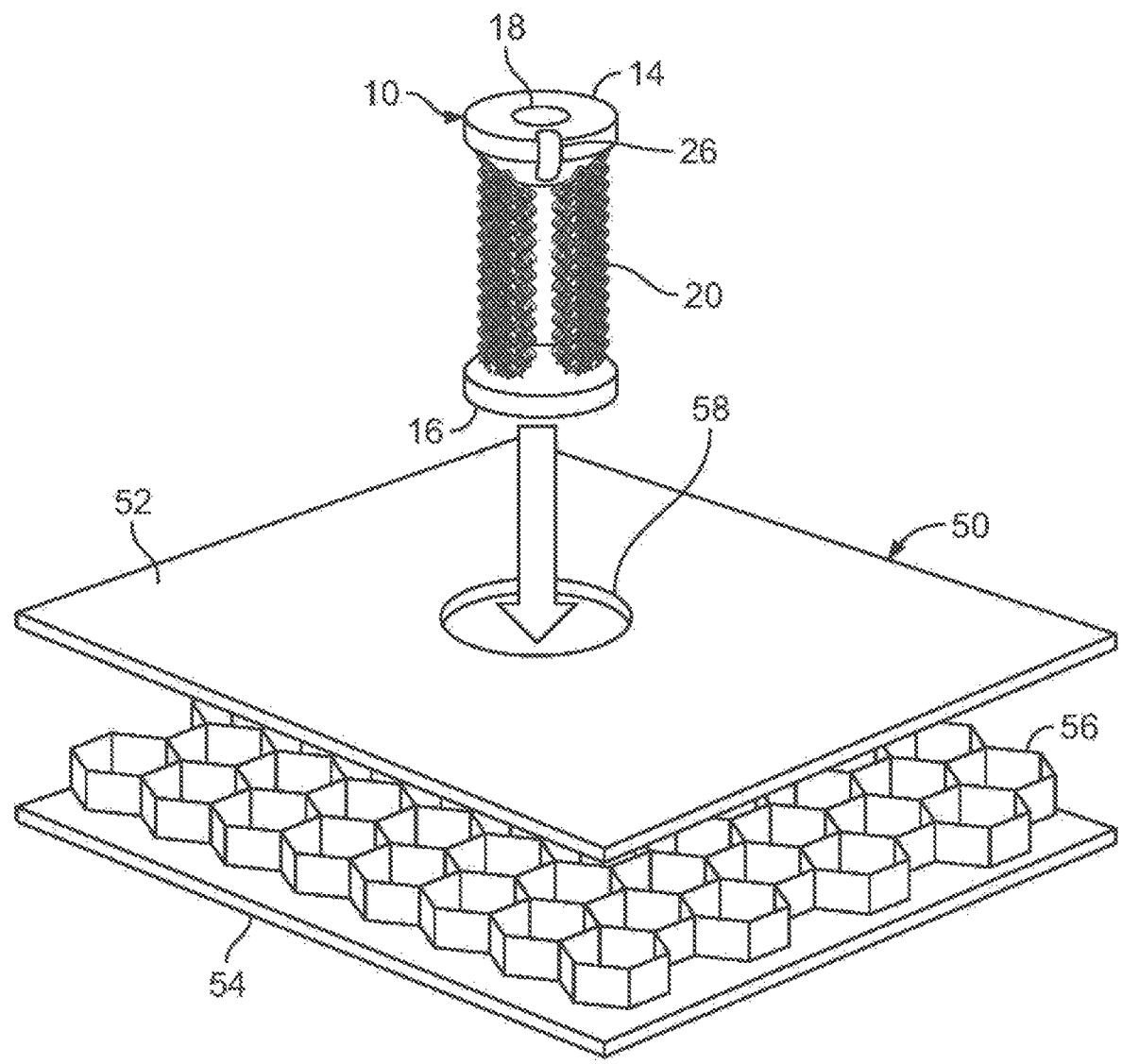
FIG. 6 represents an exploded, perspective view of the potted-in insert of FIGS. 1 through 5 and illustrates insertion of the potted-in insert into a hole in a sandwich honeycomb panel in accordance with certain nonlimiting aspects of the invention.

FIG. 6 represents an exploded view of the insert 10 and a sandwich honeycomb panel 50 that illustrates the relative orientation of the insert 10 upon installation thereof into the sandwich honeycomb panel 50. In this example, the sandwich honeycomb panel 50 includes a first face sheet 52 and a second face sheet 54 with a core 56 therebetween having an array of hollow cells that are hexagonal in cross-sectional shape and defined by a plurality of connected walls that are oriented perpendicular to the first face sheet 52 and the second face sheet 54. A hole 58 is formed in the first face sheet 52 and extends into or through at least the core 56 to receive the insert 10.

Figure 7:
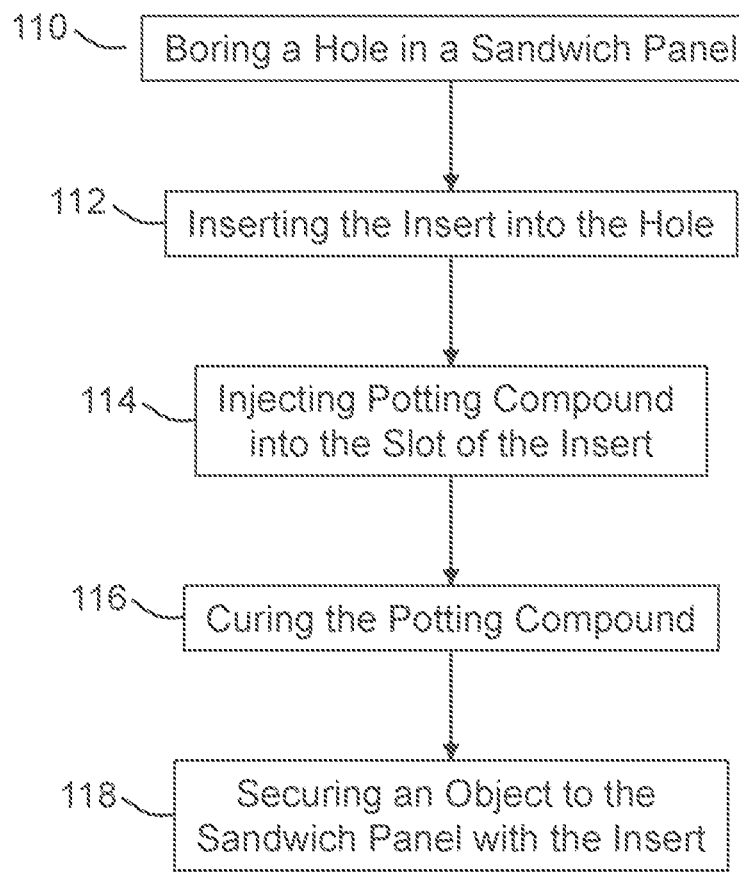
FIG. 7 represents a flow chart that includes steps for installation of the potted-in insert of FIGS. 1 through 5 in accordance with certain nonlimiting aspects of the invention.

FIG. 7 represents nonlimiting steps in a method for installing the insert 10 in a sandwich panel and subsequently securing an object to the sandwich panel using the insert 10 as an attachment point. In this example, the sandwich panel includes first and second face sheets coupled by a core therebetween. In step 110, a hole is formed in the sandwich panel through the first face sheet and into the core, for example, by drilling. The hole may extend through an entirety of the core and out through the second face sheet, or the hole may extend only through a portion of the core such that the second face sheet remains intact.

In step 112, the second end 16 of the insert 10 is located in the hole and the remainder of the body is inserted therein at least to an extent such that the opening of the hole in the first face sheet is sealed with the first end 14 of the body. If the hole extends through the second face sheet, the opening thereof in the second face sheet is preferably sealed with the second end 16 of the body. Optionally, the insert 10 may be inserted into the hole to an extent sufficient such that the exterior face of the first end 14 of the body is flush with adjacent exterior surfaces of the first face sheet. In some embodiments, the core may be reamed to expand the size of the cavity therein.

In step 114, a potting compound may be injected into the hole through the slot 26 in the first end 14 of the body. Preferably, a sufficient volume of the potting compound is injected at a sufficient pressure to substantially or entirely fill the hole, any cavities within the core fluidically connected to the hole, and the area adjacent the shaft 12 of the insert 10. The channel, if present, may promote flow of the potting compound and thereby increase the likelihood that an entirety of the hole, the cavities connected thereto, and/or the area adjacent the shaft 12 are filled.

In step 116, the potting compound is allowed to cure. This may be accomplished by passively allowing sufficient time for the potting compound to cure, or curing may be actively promoted, for example, by application of heat. After the potting compound has cured, an object my be secured to the panel using the insert 10 as an attachment point in step 118. In some embodiments, this may include inserting a fastener into the inner bore 18 of the insert 10.

The lattice structure 20 is configured to increase a bond strength of the insert 10 and the potting compound when installed within the panel relative to a potted-in insert without such lattice structure 20, and thereby increase an installed weight rating of the insert 10 allowing for relatively heavy objects to be secured to the panel using the insert 10. In addition to increasing a surface area of the insert 10 in contact with the potting compound, the voids of the lattice structure 20 are sufficiently large to receive therethrough the potting compound. During injection, the potting compound preferably flows throughout the lattice structure 20, filling the voids thereof. Once the potting compound has been cured, the struts 22 are each individually and collectively embedded within and integrated into a matrix defined by the potting compound and thereby function to anchor the insert 10 in a fixed position relative to the potting compound. With such arrangement, the lattice structure 20 may reduce the likelihood of motion of the insert 10 in six degrees of freedom.

The lattice structure 20 likely precludes the ability and/or practicality to produce the insert 10 by certain conventional processing techniques, such as milling, casting, etc. However, the insert 10 may be produced using certain additive manufacturing techniques. Suitable techniques may include, but are not limited to, binder jetting, directed energy deposition, material extrusion, powder bed fusion, and vat polymerization. A particular benefit of the embodiment of the figures is that the first intermediate portion 30 and the second intermediate portion 32 may provide a substrate upon which the lattice structure 20 may be formed. In some embodiments, the insert 10 may be produced by additive manufacturing without use of supports. In such embodiments, the insert 10 may include an integral body wherein some or all of the components thereof are integral, that is, formed of particles or layers that are, for example, fused together rather than assembled components.

The insert 10 may be formed of various materials including certain polymeric, metallic, and ceramic materials, and combinations thereof. Further, the insert 10 and the components thereof may be produced to have various dimensions. In some embodiments, the insert 10 may be produced to have specific predetermined dimensions corresponding to, for example, a thickness of the panel and/or depth of the hole thereof in which the insert 10 is to be installed. Due to the nature of additive manufacturing, the predetermined dimensions may be modified for each individual application as necessary. Alternatively, the insert 10 may be produced to have predetermined dimensions, and then subsequently modified to reduce one or more of such dimensions (e.g., the longitudinal dimension). For example, the insert 10 may be configured in a manner such that at least one of the first end 14 and the second end 16 are configured to be selectively modified to have a reduced longitudinal dimension (e.g., by machining or sanding). As such, the dimensions of the insert 10 and its components may be adjustable during manufacturing thereof and/or by the end user.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A potted-in insert for providing an attachment point for securing an object to a sandwich panel, the potted-in insert comprising:
   a shaft having a first outer diameter and a longitudinal axis;
   a first end having a second outer diameter, wherein the second outer diameter is greater than the first outer diameter;
   a second end having a third outer diameter;
   an inner bore extending through the first end, the shaft, and the second end, the inner bore defined by interior surfaces thereof, and having an inner diameter; and
   a lattice structure between the first end and the second end and in an area adjacent the shaft, the lattice structure having a maximum cross-sectional dimension perpendicular to the longitudinal axis of the shaft that is less than the second outer diameter, the lattice structure fixed to and integral with the first end, the second end, and/or the shaft, the lattice structure having a plurality of interconnected unit cells each comprising struts connected at nodes to define voids between the struts, the voids being sufficiently large to receive therethrough a potting compound.

2. The potted-in insert of claim 1, wherein the lattice structure extends from and between the first end and the second end and the struts are linear and longitudinally oriented at 45 or 135 degrees relative to the longitudinal axis of the shaft.

3. The potted-in insert of claim 1, wherein the lattice structure includes more than one layer of the unit cells in a direction extending radially from the longitudinal axis of the shaft.

4. The potted-in insert of claim 1, further comprising:
   a first intermediate portion between the first end and the shaft having a tapered outer perimeter that transitions between the first outer diameter of the shaft and the second outer diameter of the first end; and
   a second intermediate portion between the second end and the shaft having a tapered outer perimeter that transitions between the first outer diameter of the shaft and the third outer diameter of the second end.

5. The potted-in insert of claim 1, further comprising a slot through the first end and defined by recessed surfaces thereof, the slot fluidically coupling an exterior face of the first end with the area adjacent the shaft.

6. The potted-in insert of claim 1, wherein the second and third outer diameters are the same.

7. The potted-in insert of claim 1, further comprising a channel through, and defined by, the lattice structure and extending along the shaft to promote flow of the potting compound therethrough.

8. The potted-in insert of claim 7, wherein the channel is aligned with a slot that is through the first end and is defined by recessed surfaces thereof, the slot fluidically coupling an exterior face of the first end with the area adjacent the shaft.

9. The potted-in insert of claim 1, wherein the third outer diameter of the second end is greater than the first outer diameter of the shaft.

10. A method for securing an object to a sandwich panel, the method comprising:
    boring a hole in the sandwich panel;
    providing a potted-in insert comprising:
       a shaft having a first outer diameter;
       a first end having a second outer diameter, wherein the second outer diameter is greater than the first outer diameter;
       a second end having a third outer diameter;
       an inner bore extending through the first end, the shaft, and the second end, the inner bore defined by interior surfaces thereof, and having an inner diameter;
       a lattice structure between the first end and the second end and in an area adjacent the shaft, the lattice structure having a maximum cross-sectional dimension perpendicular to the longitudinal axis of the shaft that is less than the second outer diameter, the lattice structure being fixed to and integral with the first end, the second end, and/or the shaft, the lattice structure having a plurality of interconnected unit cells each comprising struts connected at nodes to define voids between the struts, the voids being sufficiently large to receive therethrough a potting compound;
    inserting the potted-in insert into the hole;
    injecting the potting compound into the hole and through the voids in the lattice structure;
    curing the potting compound; and
    securing the object to the sandwich panel using the inner bore of the potted-in insert as an attachment point.

11. The method of claim 10, wherein the potting compound is received in more than one layer of the unit cells of the lattice structure in a direction extending radially from the longitudinal axis of the shaft.

12. The method of claim 10, wherein the potting compound is injected into the hole through a slot through the first end of the potted-in insert and defined by recessed surfaces thereof, the slot fluidically coupling an exterior face of the first end with the area adjacent the shaft.

13. The method of claim 10, wherein the hole is sealed by the first end of the potted-in insert and the potting compound.

14. The method of claim 10, wherein an exterior face of the first end of the potted-in insert is positioned flush with adjacent exterior surfaces of the sandwich panel.

15. The method of claim 10, further comprising flowing the potting compound through a channel formed through and defined by the lattice structure along the shaft configured.

16. The method of claim 10, wherein the sandwich panel is a sandwich honeycomb panel.

17. A method comprising:
producing a potted-in insert with an additive manufacturing process such that the potted-in insert has an integral body comprising:
- a shaft having a first outer diameter;
- a first end having a second outer diameter, wherein the second outer diameter is greater than the first outer diameter;
- a second end having a third outer diameter;
- an inner bore extending through the first end, the shaft, and the second end, the inner bore defined by interior surfaces thereof, and having an inner diameter; and
- a lattice structure between the first end and the second end and in an area adjacent the shaft, the lattice structure having a maximum cross-sectional dimension perpendicular to the longitudinal axis of the shaft that is less than the second outer diameter, the lattice structure being fixed to and integral with the first end, the second end, and/or the shaft, the lattice structure having a plurality of interconnected unit cells each comprising struts connected at nodes to define voids between the struts, the voids being sufficiently large to receive therethrough a potting compound.

18. The method of claim 17, wherein the lattice structure extends from and between the first end and the second end and the struts are linear and longitudinally oriented at 45 or 135 degrees relative to the longitudinal axis of the shaft, and the additive manufacturing process is performed without the use of supports.

19. The method of claim 17, further comprising producing the integral body to include a first intermediate portion between the first end and the shaft having a tapered outer perimeter that transitions between the first outer diameter of the shaft and the second outer diameter of the first end, and a second intermediate portion between the second end and the shaft having a tapered outer perimeter that transitions between the first outer diameter of the shaft and the third outer diameter of the second end.

20. The method of claim 17, further comprising producing the integral body to include a slot through the first end defined by recessed surfaces thereof, the slot fluidically coupling an exterior face of the first end with the area adjacent the shaft and a channel through, and defined by, the lattice structure and extending along the shaft, wherein the channel is aligned with the slot.

* * * * *